United States Patent [19]
Armor et al.

[11] Patent Number: 5,299,732
[45] Date of Patent: Apr. 5, 1994

[54] PACKAGE AND A HANDLE FOR THE PACKAGE BOTH OF WHICH ARE MADE FROM PAPERBOARD TO FACILITATE EASY RECYCLING

[75] Inventors: Patrick D. Armor, Cincinnati, Ohio; Charles L. Gunn, Lawrenceburg, Ind.

[73] Assignee: The Procter & Gamble Company, Cincinnati, Ohio

[21] Appl. No.: 57,593

[22] Filed: May 5, 1993

[51] Int. Cl.⁵ .............................................. B65D 5/46
[52] U.S. Cl. ........................ 229/117.25; 220/416; 229/117.22; 229/225
[58] Field of Search ............... 229/117.19, 117.22, 229/117.24, 117.25, 225; 220/416, 418, 770

[56] References Cited

U.S. PATENT DOCUMENTS

| | | |
|---|---|---|
| 205,355 | 6/1878 | Cole . |
| 2,109,034 | 2/1938 | Seifer ................................ 229/52 |
| 2,128,723 | 8/1938 | Zettler ......................... 229/117.19 |
| 2,167,936 | 8/1939 | Brooks ......................... 229/117.25 |
| 2,194,898 | 3/1940 | Hanford ............................ 294/27 |
| 2,612,308 | 9/1952 | Potts ........................... 229/117.19 |
| 2,645,406 | 7/1953 | Robins ......................... 229/117.25 |
| 2,807,407 | 9/1957 | Van Rosen ...................... 229/52 |
| 2,938,656 | 5/1960 | Bertram ........................... 229/52 |
| 3,144,196 | 8/1964 | Sindars ............................ 229/52 |
| 3,726,470 | 4/1973 | Naylor ......................... 229/117.25 |
| 3,768,720 | 10/1973 | Bundy ......................... 229/117.19 |
| 3,927,812 | 12/1975 | Winters et al. ..................... 220/770 |
| 4,775,093 | 10/1988 | Lin ................................ 220/770 |
| 4,884,837 | 12/1989 | Nakazawa ..................... 229/117.25 |
| 4,986,420 | 1/1991 | Gunn et al. .................... 229/117.22 |
| 5,137,209 | 8/1992 | Roberts et al. ................. 229/117.25 |

FOREIGN PATENT DOCUMENTS

| | | | |
|---|---|---|---|
| 2653748 | 5/1991 | France ......................... 229/117.22 |
| 1482712 | 8/1977 | United Kingdom ........... 229/117.25 |

Primary Examiner—Gary E. Elkins
Attorney, Agent, or Firm—Dean L. Garner

[57] ABSTRACT

A package and a handle for the package both of which are made from paperboard for easy recycling. The package is generally rectangular and has apertures on opposing sides. The handle has an elongated body section extending between two ends, and two anchors in a substantially juxtaposed relation to each of the ends. The ends of the handle are inserted into the apertures on the package so that the anchors are disposed within the package. The anchors are made up of a securing tab and a barb. The securing tab is made from a length of the anchor which is secured to the end of the handle whereas the barb comprises a length of the anchor which is above the securing tab which is left unsecured to the end of the handle. The handle is such that when the package is lifted by the handle, the barbs extend above the top of the aperture and the securing tabs extend below the bottom of the aperture.

11 Claims, 7 Drawing Sheets

PACKAGE AND A HANDLE FOR THE PACKAGE BOTH OF WHICH ARE MADE FROM PAPERBOARD TO FACILITATE EASY RECYCLING

FIELD OF THE INVENTION

The present invention relates to handles for paperboard packages. The present invention has further relation to such handles which are made of paperboard so that the handles do not need to be separated for recycling. The present invention has even further relation to such handles which are designed to be inserted into opposing apertures on the paperboard packages.

BACKGROUND OF THE INVENTION

Many products which are provided to consumers are packaged in paperboard packages, cartons, containers or the like. Among the list of consumer products packaged in paperboard packages are granular detergents such as laundry detergents and dishwashing detergents. Granular detergents are generally used in relatively large volumes. Consequently, large volumes of these products are consumed each year. Due to a vast quantity of consumer products sold in granular form there is a desire to constantly improve the design of the packages which house these products.

An example of a package suitable for housing consumer products such as granular materials is described in U.S. Pat. No. 4,986,420 issued to Gunn et al. on Jan. 22, 1991, which is hereby incorporated herein by reference. The Gunn et al. reference describes a rectangular package for housing granular materials. The package has two opposing apertures on its sidewalls. The package is provided with a flat strap handle, typically made from plastic, having a barb member at each end. One end of the handle is inserted into one of the apertures and the other is inserted into the other aperture so as to secure the handle to the package. When the package is lifted by the handle, the barb member on each end hooks underneath the outer body of the package which surrounds the aperture, thereby preventing the handle from pulling out of the aperture or otherwise detaching itself from the package.

Recently, in order to save natural resources, there has been a desire to make the handles of these packages from materials which can be recycled with the paperboard package so that the handle does not have to be separated from the package for recycling. However, the structure of the handle described in the Gunn reference and which is also described in U.S. Pat. No. 5,137,209 issued to Roberts et al. on Aug. 11, 1992, which is also hereby incorporated herein by reference, is adapted to made from materials having a relatively high strength such as plastic. If the handle described in the above-incorporated references were to be made out of paperboard, the handle would most likely rip or buckle at the barb sections during attempts to lift the package by the handle. This would be especially true when the package was rather large and a substantial amount of weight was being carried by the handle. Because paperboard easily tears, many of the handle designs which are used today are adapted to be made from materials such as plastic and simply cannot be made from paperboard.

There has therefore been a desire to design a paperboard handle which can be used with a paperboard package of the type described above which will not rip tear or break after multiple uses and which does not need to be separated from the package for recycling purposes.

It is therefore an object of the present invention to provide a paperboard handle that is adapted to be attached to a paperboard package and which will not easily rip, tear or otherwise break when used to lift the package.

It is another object of the present invention to make such a paperboard handle so that it does not have to be separated from the package to be recycled.

The aforementioned and other objects of the invention will become more apparent hereinafter.

SUMMARY OF THE INVENTION

In accordance with the present invention there is provided, in combination, a package and a handle for the package, both of which are made from paperboard so that the handle does not need to be separated from the package for recycling purposes. The package has opposing front and back walls, opposing top and bottom walls and opposing side walls. All of the walls are connected together so as to define an interior chamber for containing a product. At least one of the opposing side walls and the opposing front and back walls of the package each have an aperture disposed therein.

The handle has an elongated body section extending along a longitudinal axis between two ends. The handle further includes two anchors each adjacent to one of the ends in a substantially juxtaposed relation. Each of the ends of the handle being inserted into one of the apertures on the side walls of the package so that the anchors are substantially disposed within the interior chamber of the package. The anchors are made up of a securing tab and a barb. The securing tab is made from a first predetermined length of the anchor which is secured to the end of the handle. The barb comprises a second predetermined length of the anchor, above the securing tab, which is left unsecured to the end of the handle. These first and second predetermined lengths are such that when the package is lifted by the handle, the barbs extend above the top of the aperture and the securing tabs extend below the bottom of the aperture.

BRIEF DESCRIPTION OF THE DRAWINGS

While the specification concludes with claims particularly pointing out and distinctly claiming the subject invention it is believed that the same will be better understood from the following description when taken in conjunction with the accompanying drawings in which:

DETAILED DESCRIPTION OF THE INVENTION

Figure 1:
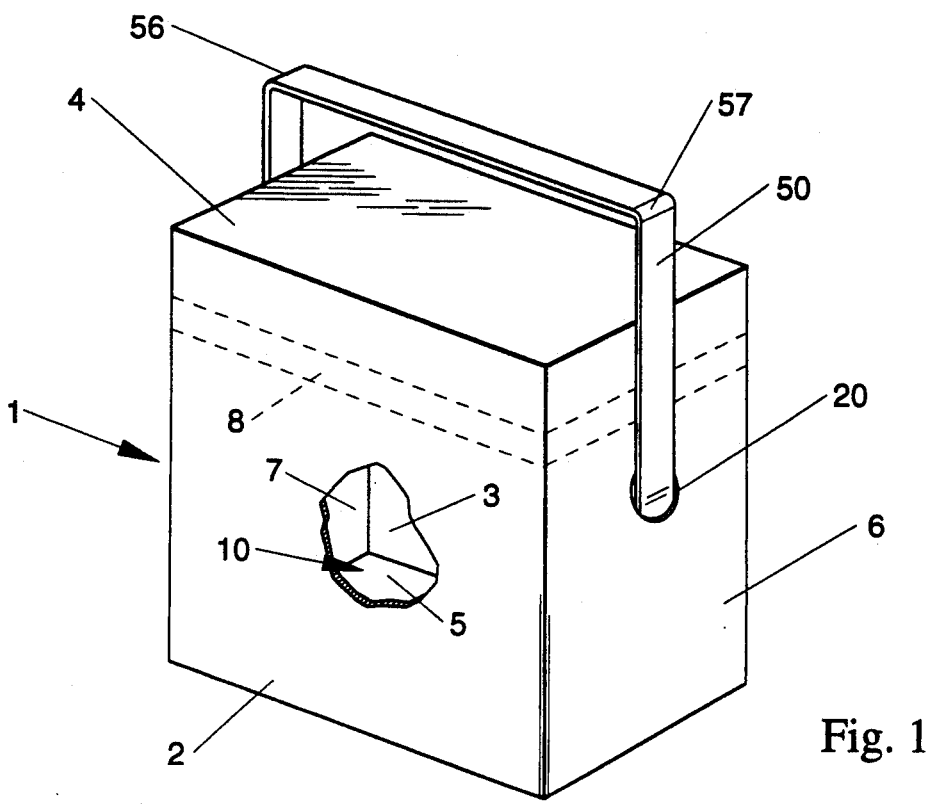
FIG. 1 is a perspective view of package adapted for use with a handle of the present invention.
Figure 2:
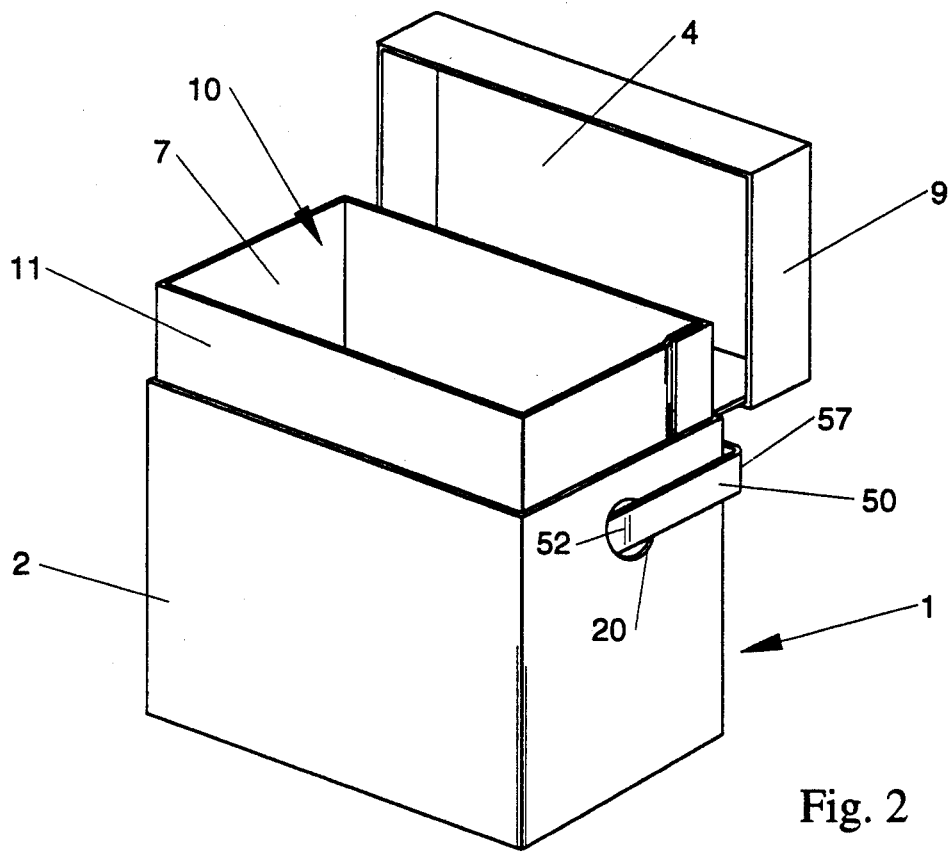
FIG. 2 is a view similar to that of FIG. 1 but with the tear strip removed and the lid in its open position and the handle it its storage position.

Referring to the drawings in detail wherein like numerals indicate the same element throughout the views there is shown in FIG. 1 a perspective view of a rectangular paperboard package 1 and a handle 50 in accordance with the present invention. Package 1 includes opposing front and back walls 2 and 3, opposing top and bottom walls 4 and 5, and opposing side walls 6 and 7 all of which are connected together to define an interior chamber 10 for containing consumer products such as granular detergents. The opposing side walls 6 and 7 each have an aperture 20 and 30 (not shown) disposed therein, designed to receive the handle 50 for attachment to the package 1. Package 1 further includes a tear strip 8 comprising two score lines extending across the front and side walls. As shown in FIG. 2, upon removal of the tear strip 8 a lid 9 is defined which is hinged along the back wall 3. Package 1 typically includes a liner 11 which is contiguous with the front back and side panels. Apertures 20 and 30 will extend through side walls 6 and 7 but not through liner 11. This is so the consumer product in interior chamber 10 will not migrate through the aperture during the use of the packages.

Figure 3:
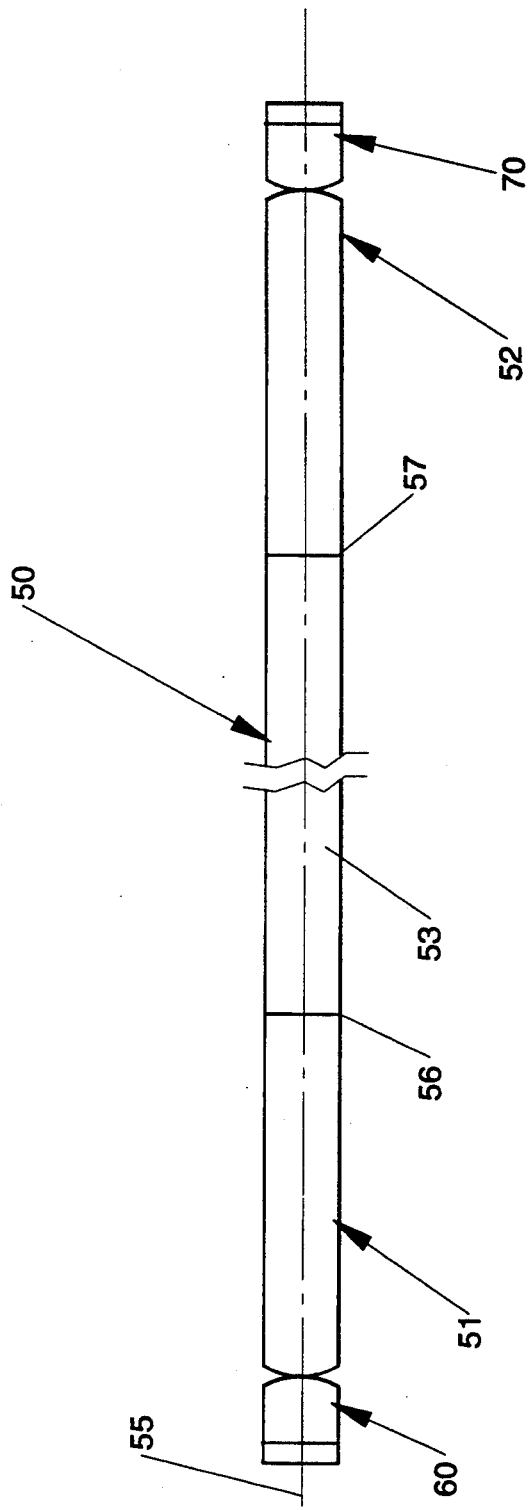
FIG. 3 is a plan view of the handle of the present invention before it is completely constructed.
Figure 4:
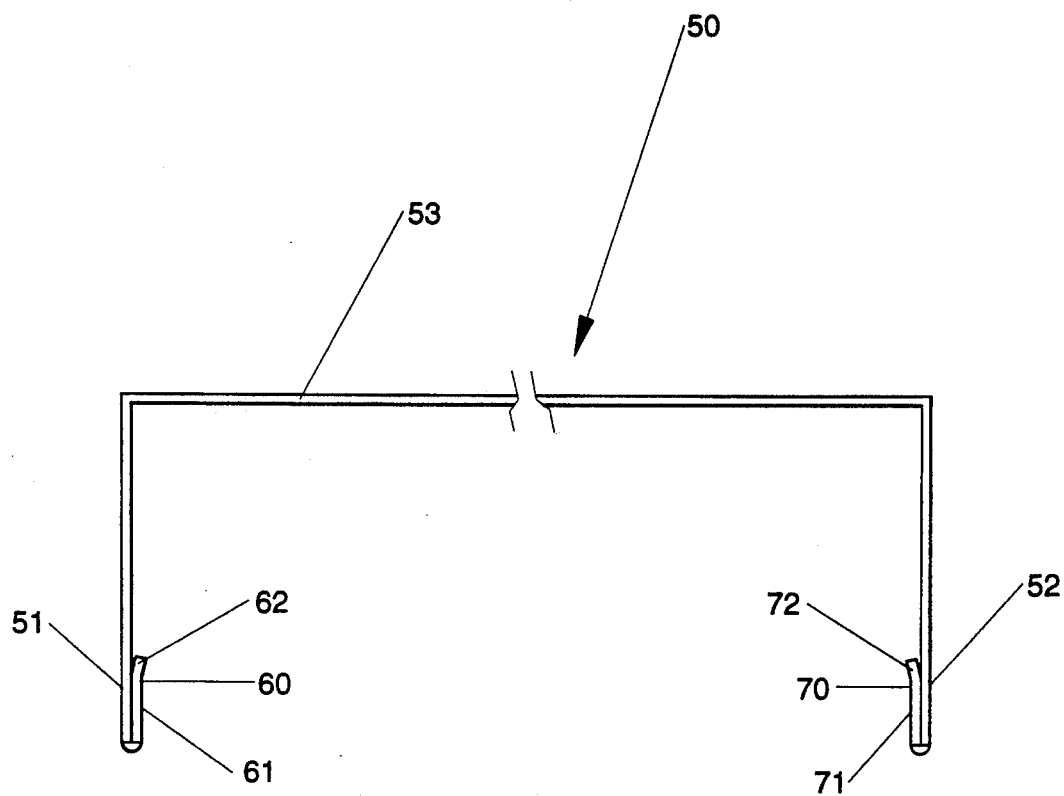
FIG. 4 is an elevational view of a fully constructed handle in accordance with the present invention.

Handle 50 of the present invention can best be described by referring to FIG. 3 which is a plan view of Handle 50 before it is fully constructed. Handle 50 includes an elongated body section 53 extending along a longitudinal axis 55 between two ends 51 and 52. Handle 50 further includes two anchors 60 and 70 adjacent ends 51 and 52 respectively. By referring to FIG. 4 in conjunction with FIG. 3 one can see that anchors 60 and 70 are folded over so as to substantially juxtapose ends 51 and 52 when the handle is fully constructed. Anchor 60 comprises securing tab 61 and barb 62. Securing tab 61 is a first predetermined length of anchor 60 which is secured to end 51, whereas barb 62 comprises a second predetermined length of anchor 60, above securing tab 61 towards body section 53, which is left unsecured to end 51. Likewise, anchor 70 comprises securing tab 71 and barb 72. Securing tab 71 is a first predetermined length of anchor 70 which is secured to end 52, whereas barb 72 comprises a second predetermined length of anchor 70, above securing tab 71 towards body section 53, which is left unsecured to end 52. In a preferred embodiment, as shown in the figures, the securing tabs extend out to the extreme ends of the handle, thereby leaving no point of the anchors unsecured to the handle below the barbs. That is in one embodiment the anchors are secured to the handle from the barb down.

Figure 5:
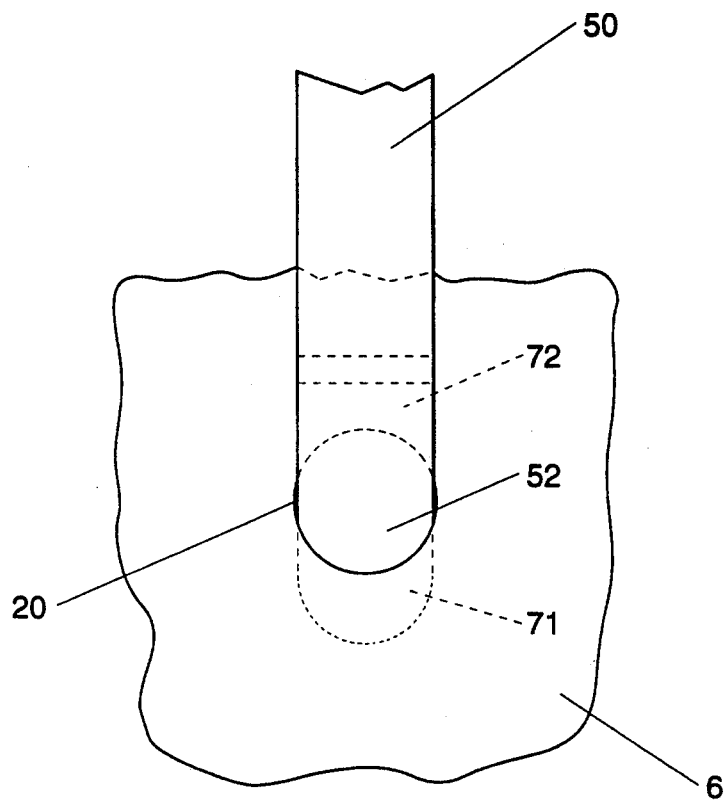
FIG. 5 is a partial front elevational view of the end 52 of handle 50 inserted into the aperture 20.
Figure 6:
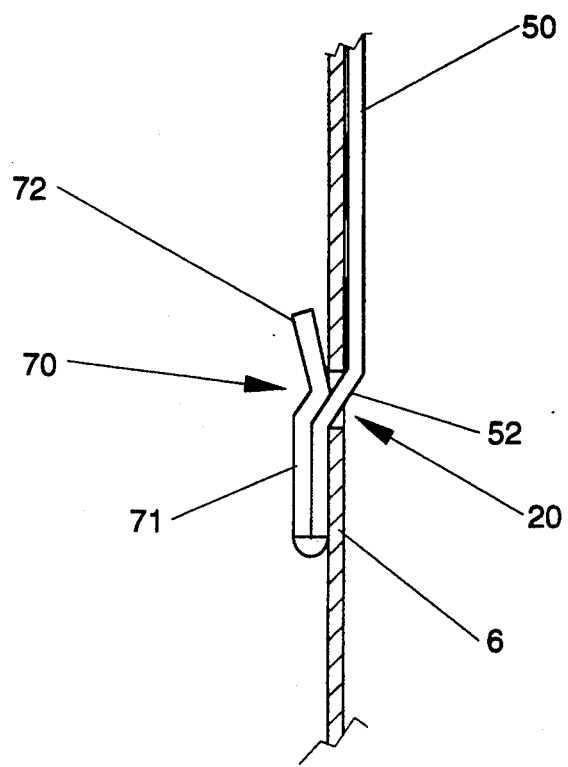
FIG. 6 is a partial side elevational view of the end 52 of handle 50 inserted into the aperture 20.

As seen from both FIGS. 5 and 6, end 52 of handle 50 is inserted into aperture 20 so that the aperture is substantially disposed within interior chamber 10 of package 1. Similarly, end 51 of handle 50 is inserted into aperture 30 so that the aperture is substantially disposed within interior chamber 10 of package 1. When end 52 of handle 50 is inserted into aperture 20 of package 1 and the package is lifted by the handle, the first and second predetermined lengths of anchor 70, which define securing tab 71 and barb 72, are such that securing tab 71 extends below the bottom of aperture 20 while barb 72 extends above aperture 20. The same is true for anchor 60 but is not shown in the Figures. That is, when end 51 of handle 50 is inserted into aperture 30 of package 1 and the package is lifted by the handle, the first and second predetermined lengths of anchor 60, which define securing tab 61 and barb 62, are such that securing tab 61 extends below the bottom of aperture 30 while barb 62 extends above aperture 30. Because the barbs extend above the apertures and the securing tabs extend below the apertures the handle will not easily detach from the package when the package is lifted by the handle. The securing tabs press against the inner surface of the side walls and prevent the handle from detaching itself from the package when the package is lifted. If the securing tabs were not there and the anchor was merely folded over to form a barb, the anchor would unfold and the handle would detach itself from the package when the handle was lifted. The barbs provide a means for lifting the package by hooking underneath the top of the aperture. Therefore, the strength of the barb is not dependent upon the strength of the paperboard used but rather on the strength of the securement between the anchors and the ends. It is therefore possible to make strong barbed handle out of paperboard using the design of the present invention.

Handle 50 can be made from various types of paperboard known in the art. One preferred type of paperboard known in the art is cylinder board. The anchors 60 and 70 can be secured along their lower ends to form securing tabs 61 and 71 by any number means known in the art including adhesives and staples. One preferred adhesive known in the art is white cold glue available from Findley Adhesives, 11320 Watertown Plank Rd., Wawatosa, Wis. 53226-3413. Handle 50 can be manufactured using any number means known in the art including the use of stamping, scoring and folding operations.

As seen from FIG. 3, the extreme portions of ends 51 and 52 are rounded as are the corresponding portions of anchors 60 and 70 which juxtapose the extreme portions of ends 51 and 52. This makes it easier to insert the ends into the apertures on the package. It is preferred that the width of the handle be substantially equal to the diameter of the apertures. If the apertures are too small, the ends of the handle would then have to be crimped or otherwise folded in order to be inserted into the apertures. This is undesirable for a paperboard handle as crimping of the paperboard could cause it to crack or break. If the width of the handle is too small, however, the chances of it becoming inadvertently detached from the package increases.

Handle 50 also includes score lines 56 and 57 which help to square off the handle. This is done so that when the package is not in use it can be placed in its storage position as shown in FIG. 2. This is when the body 53 of handle 50 co-extends and abuts either the front wall 2 or back wall 3. Score lines 56 and 57 are spaced at substantially equal distances from the center of the body section 53 and are spaced from each other at a distance substantially equal to the width of the package, being the distance between opposing side walls 6 and 7. Because the handle is squared off by these score lines it is preferred, when making the handle from cylinder board, that the handle have a thickness between about 0.020 inches to about 0.040 inches. If the paperboard is to thick the handle will crack when score lines 56 and 57 are placed there. If the handle is too thin the handle will break along score lines 56 and 57 when the package is lifted by the handle.

In order for the handle to be in the storage position as shown in FIG. 2, the maximum distance from score lines 56 and 57 to their nearest ends, 51 and 52 respectively, must be less than the width of side walls 6 and 7, being the distance from front wall 2 to back wall 3. If this is not so the body 52 of handle 50 will not lie flat against the front or back wall as shown in FIG. 2. However, the handle needs to be long enough so that the consumer is comfortable in carrying the package with the handle in its carrying position as shown in FIG. 1. That is the consumer's hands must fit comfortably between the handle 50 and the top wall 4.

Figure 7:
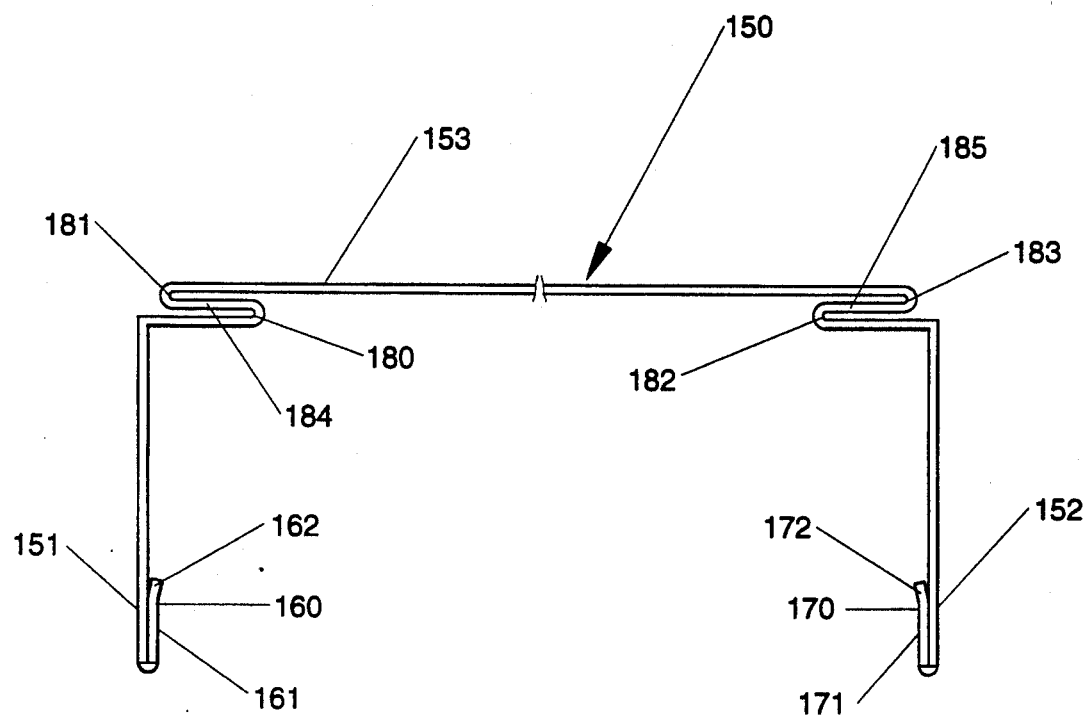
FIG. 7 is an elevational view of an alternative embodiment of a fully constructed handle in accordance with the present invention.

Therefore, in order to better provide a handle which is short enough to assume the storage position before use by the consumer, but long enough to provide a comfortable carrying position it is sometimes preferred to provide the handle with a means to extend its length upon being carried by a consumer. An example of a handle which can extend its length is shown in FIG. 7 where there is shown an elevational view of an alternative embodiment of a handle 150 in accordance with the present invention. Handle 150 is similar to handle 50 and includes an elongated body section 153 extending between two ends 151 and 152 and having two anchors 160 and 170 adjacent the ends. Anchor 160 comprises securing tab 161 and barb 162 and anchor 170 comprises securing tab 171 and barb 172. The barbs and securing tabs are formed in the same way as with handle 50 described above.

Handle 150 includes four additional score lines 180, 181, 182, and 183. Score lines 180 and 181 are folded in opposite directions to create extension section 184 which is sandwiched between body 153. Similarly, score lines 182 and 183 are folded in opposite directions to create extension section 185 which is sandwiched between body 153. When the consumer is ready to use the handle, body 153 is grabbed and pulled, thereby extending handle 150 and making it longer. In order to keep the handle in place during storage an adhesive is preferably placed between extension sections 184 and 185 and the portions of the handle which abut against those extension sections. Preferably a small amount of a hot melt adhesive is used so that the handle can easily be extended without the ripping or tearing the paperboard material.

Figure 8:
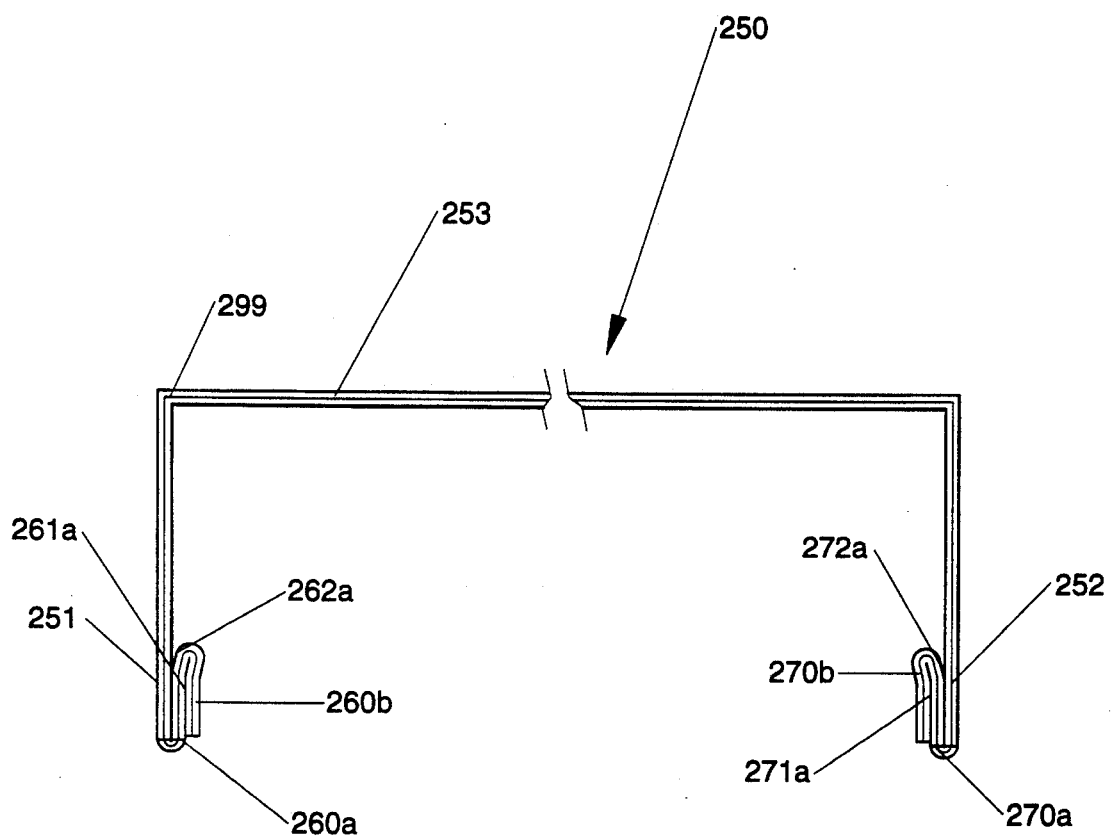
FIG. 8 is an elevational view of an alternative embodiment of a fully constructed handle in accordance with the present invention.

An alternative embodiment of the handle of the present invention is shown in FIG. 8, where there is shown a side elevational view of handle 250. Handle 250 is similar to handle 50 and includes an elongated body section 253 extending between two ends 251 and 252. However, handle 250 has four anchors 260a, 260b and 270a, and 270b. Anchors 260a and 260b. Anchor 260a comprises securing tab 261a and barb 262a and anchor 270a comprises securing tab 271a and barb 272a. Additional anchors 260b, and 270b juxtapose anchors 260a and 260b and have barbs and securing tabs which correspond to the barbs and securing tabs of anchors 260a, and 270b. Anchors 260b and 270b are secured to anchors 260a and 270a, preferably along points corresponding to their securing tabs. Anchors 260b and 270b can be formed from any means. In FIG. 8 the additional anchors extend from anchors 260a and 270a and are then folded over so as to juxtapose the same. These additional anchors provide added strength to the handle.

As seen in FIG. 8, one or more layers of polyvinyl alcohol (PVA) 299 can be disposed within the layers of paperboard in order to reinforce the handle. Because PVA is water soluble, it does not need to be separated from the rest of the package when it is recycled. That is the handle would comprise a layer of PVA sandwiched between two layers of paperboard. This would allow the handle to become thinner while maintaining the strength around score lines 56 and 57. In a similar fashion the handle could be laminated or coated with PVA in order to provide added strength to the handle.

While particular embodiments of the present invention have been illustrated and described various modifications will be apparent to those skilled in the art without departing from the spirit and scope of the present invention. Accordingly, the scope of the present invention should be considered in terms with the following claims and is understood not to be limited to the details described and shown in the specification and drawings.

What is claimed is:

1. In combination, a package and a handle for said package, said handle and said package both being made from paperboard so that said handle does not need to be separated from said package for recycling purposes, said combination comprising:
   (a) said package comprising opposing front and back walls, opposing top and bottom walls and opposing side walls all of which are connected together so as to define an interior chamber for containing a product, each side wall having an aperture disposed therein; and
   (b) said handle comprising an elongated body section extending along a longitudinal axis between two ends, said handle further including one anchor adjacent to each end in substantially juxtaposed relation, each of said ends being inserted into one of said apertures of said package so that said anchors are substantially disposed within said interior chamber of said package, each anchor comprising a securing tab and a barb, each securing tab comprising a first predetermined length of said anchor which is secured to said end, each barb comprising a second predetermined length of said anchor above said securing tab which is left unsecured to said end, said first and second predetermined lengths of each securing and each barb being such that when said package is lifted by said handle, each barb extends above an aperture and each securing tab extends below an aperture.

2. The combination of claim 1 wherein said handle further includes at least two additional anchors each juxtaposing and attached to one of said anchors.

3. The combination of claim 1 wherein said ends of said handle and said anchors have extreme portions which are rounded.

4. The combination of claim 1 wherein said handle has a width which is substantially equal to the diameters of said apertures on said package.

5. The combination of claim 1 wherein said handle further includes two score lines spaced at substantially equal distances from a center of said body section between said ends and spaced from each other at a distance substantially equal to the distance between said opposing side walls said handle being folded along said score lines so as to square off said handle.

6. The combination of claim 5 wherein the distance from an end of said handle to a score line closest to that end has a maximum value less than the distance between said opposing front and back walls.

7. The combination of claim 1 wherein said handle is made from cylinder board having a thickness from about 0.020 inches to about 0.040 inches.

8. The combination of claim 1 wherein said handle includes a means to extend the length of said handle, between said ends, when said handle is being used.

9. The combination of claim 8 wherein said means to extend said handle comprises two pairs of opposing fold lines on said body of said handle, said handle being folded along said fold lines to create two extension sections sandwiched between and releasably secured to said elongated body section of said handle.

10. The combination of claim 1 wherein said handle comprises at least one layer of polyvinyl alcohol sandwiched between at least two layers of paperboard.

11. The combination of claim 1 wherein said package further includes a liner within said interior chamber contiguous with the front back and side walls, said anchors of said handle thereby being substantially disposed within said interior chamber of said package between said side walls and said liner.

* * * * *

UNITED STATES PATENT AND TRADEMARK OFFICE
CERTIFICATE OF CORRECTION

PATENT NO. : 5,299,732

DATED : April 5, 1994

INVENTOR(S) : Patrick D. Armor et al.

It is certified that error appears in the above-identified patent and that said Letters Patent is hereby corrected as shown below:

Column 4, line 63, delete "to" and insert therefor -- too --.

Column 6:

Claim 1, line 42, after "securing" insert -- tab --.

Claim 5, line 60, after "walls" insert a --, --.

Signed and Sealed this

Eighteenth Day of April, 1995

Attest:

BRUCE LEHMAN

Attesting Officer

Commissioner of Patents and Trademarks